United States Patent [19]
Pfarrwaller

[11] 3,779,102
[45] Dec. 18, 1973

[54] DIFFERENTIAL GEAR
[75] Inventor: Erwin Pfarrwaller, Winterthur, Switzerland
[73] Assignee: Sulzer Brothers Ltd., Winterthur, Switzerland
[22] Filed: Mar. 22, 1972
[21] Appl. No.: 237,093

[30] Foreign Application Priority Data
Mar. 26, 1971  Switzerland.................... 004503/71

[52] U.S. Cl.................................. 74/713, 74/410
[51] Int. Cl........................ F16h 1/40, F16h 57/00
[58] Field of Search..................................... 74/713

[56] References Cited
UNITED STATES PATENTS

| | | | |
|---|---|---|---|
| 1,445,864 | 2/1923 | Alden | 74/713 |
| 2,771,791 | 11/1956 | Bachman | 74/713 X |
| 999,876 | 8/1911 | Ross | 74/713 |
| 2,548,258 | 4/1951 | Griffith | 74/713 |
| 2,997,898 | 8/1961 | Ellis | 74/757 X |
| 3,532,183 | 10/1970 | Shealey | 74/713 UX |

*Primary Examiner*—Arthur T. McKeon
*Attorney*—Hugh A. Chapin et al.

[57] ABSTRACT

The two warp beams are each connected to different bevel gears in the transmission. These bevel gears are in meshing engagement with two planet pinions mounted in a freely mounted carrier. The carrier is, in turn, mounted in diametrically opposite slots in a driving wheel for the transmission. The driving wheel is driven over a worm. Any variation in speed between the warp beams causes the planet pinions to turn relative to the bevel gears to compensate for the variation without overstressing the gears.

5 Claims, 3 Drawing Figures

DIFFERENTIAL GEAR

This invention relates to a differential gear. More particularly, this invention relates to a differential gear for a warp let-off motion in a weaving machine.

Heretofore, the transmissions used in weaving machines for driving two or more warp beams have been known to use differential gears to separately drive the let-off motions for the warp beams from a common drive. In some instances, the differential gears have utilized a driving wheel and two bevel gears which are coaxial with the driving wheel. The bevel gears have been coupled together by at least two plant bevel pinions which mesh with the bevel gears and which are also mounted on the driving wheel. In some cases, each of the planet pinion shafts can, of course, be journalled separately in a bearing fixed to the driving wheel.

However, in these arrangements, the meshing bevel gears of the differential gear must be located especially accurately, since even slightly deviations from the theoretical position, for example due to tilting of the meshing bevel gears, may give rise to high local stressing of the gear teeth due to binding and large frictional forces. Further, it is particularly difficult to ensure even loading of both the gears in each pair of bevel gears. Often, even loading is not obtained until one of the bevel gears is somewhat worn. Generally, faults of this type may, for example, be caused by vibration of the shafts by which the two bevel gears coupled by the planet pinions are connected to two warp beam transmissions which transmissions are usually separated by the width of the weaving machine.

Accordingly, it is an object of the invention to provide a heavy-duty differential gear in which the uneven stressing of meshing bevel gears is avoided and the tooth forces automatically cancel out.

It is another object of the invention to reduce friction losses to a minimum in a differential gear.

It is another object of the invention to provide a differential gear of compact construction.

Briefly, the invention provides a differential gear having a driving shaft, a pair of coaxial bevel gears mounted thereon, and a pair of planet bevel pinions with a common carrier on which the planet bevel pinions are coaxially mounted. In addition, the carrier is displaceably mounted in two diametrically opposite guides in a driving wheel with the guides having guideways extending axially relative to the planet pinions. This provides a "floating" arrangement for the two planet pinions which permits the pinions to always, automatically and accurately, take up a position in which the tooth forces of the two bevel gears cancel out.

In order to compensate for the forces to be transmitted even when there is a change in the angle between the planet pinions and the meshing bevel gears meshing each of the guides for the carrier are formed by a slot-like recess with sides which are parallel to an imaginary radial plane of the driving wheel and between which the carrier is mounted so as to be movable axially and radially relative to the driving wheel.

Preferably, thrust bearing means for the two planet pinions are disposed on the carrier, so that the axial forces exerted on the planet pinions are channeled into the carrier where they cancel one another out instead of being transmitted to the driving wheel.

In one embodiment of the invention, the driving wheel is journalled directly in a casing which receives the differential gear. This arrangement ensures that the driving wheel is guided securely and independently of the positions of the other parts of the differential gear at any time, and therefore that the differential gear runs particularly quietly.

A differential gear which operates with particularly low friction losses and in which the loads on the components are satisfactory can be obtained if each of the bevel gears coaxial with the driving wheel is journalled separately in the casing. In order to reduce the friction losses further, and to prevent stress on the casing due to the axial forces of the coupled bevel gears, the bevel gears may be supported relative to one another in axial direction.

In order to improve the contact ratios in a differential gear, a pinion meshing with the driving wheel may be journalled in the casing. The co-operating wheels, for example a worm and wormwheel, can therefore be located particularly accurately relative to one another.

In order to give a particularly compact differential gear, two pinions are journalled in the casing with each pinion being associated with a respective step-up or step-down transmission and connected to one of the bevel gears.

These and other objects and advantages of the invention will become more apparent from the following detailed description and appended clams taken in conjunction with the accompanying drawings in which.

Figure 1:
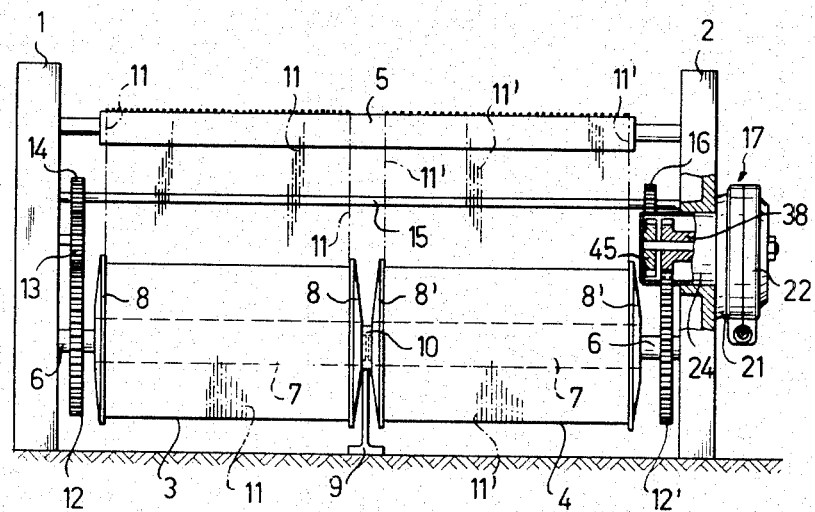
FIG. 1 illustrates a view of a weaving machine with a differential gear embodying the invention as seen from the warp end (rear end)

Referring to FIG. 1, the weaving machine includes a pair of uprights 1, 2 between which two mutually coaxial warp beams (sectional warp beams) 3, 4 and a tensioning beam 5 are mounted. Each of the warp beams 3, 4 comprises a warp beam tube 7 which is mounted on a shaft 6 and to which two warp beam flanges 8, 8' are fixed. The shaft for the tensioning beam 5 and the outer ends of the warp beam shafts 6 are mounted in uprights 1, 2. A support 9 belonging to the machine base is mounted intermediately of the beams 3, 4 and has a common bearing 10 in which the inner two ends of the warp beam shafts 6 are journalled.

Each warp beam tube 7 has a plurality of warp yarns 11, 11' wound thereon in rolls defined laterally by the flanges 8, 8'. The yarns 11, 11' are run off the warp beams 3, 4, to pass over the tensioning beam 5 and other components (not shown) of the weaving machine to a cloth beam which takes the finished cloth as is known.

A gearwheel 12 or 12' is fixed to each of the two warp beam shafts 6. One wheel 12 meshes with an idler 13 which is mounted on a pivot (not shown) attached to the upright 1 and which meshes with a pinion 14 carried by a shaft 15 journalled in the uprights 1, 2. The shaft 15 carriers a pinion 16 near the upright 2 which has the same size and number of teeth as pinion 14.

The two warp beams 3, 4 are coupled by a differential gear 17 connected to the weaving machine drive. The differential gear 17 is mounted in a casing 21 which is fixed to the outside of the upright 2 and to which a cover 22 is screwed. A tubular portion 24 of the casing passes through the upright 2 and projects from the upright 2 on the inside.

Figure 2:
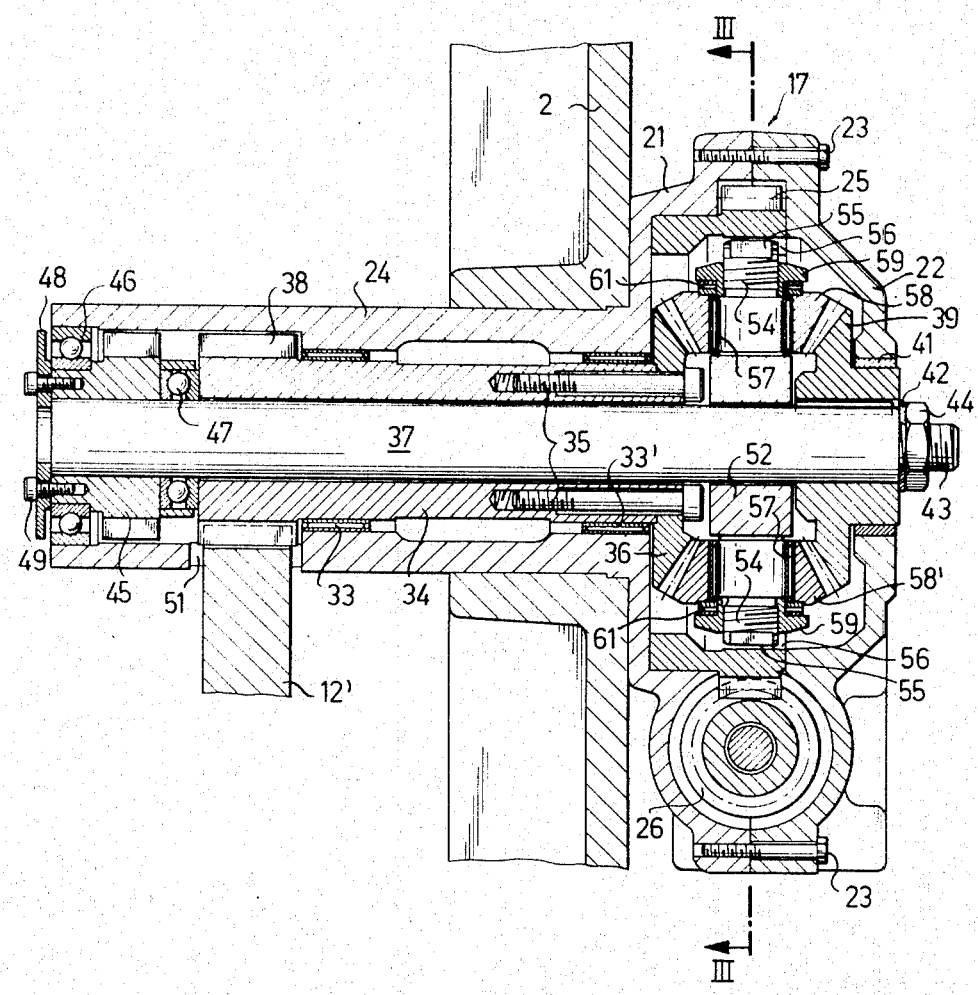
FIG. 2 illustrates a longitudinal sectional view through a differential gear similar to that of FIG. 1 on a larger scale.
Figure 3:
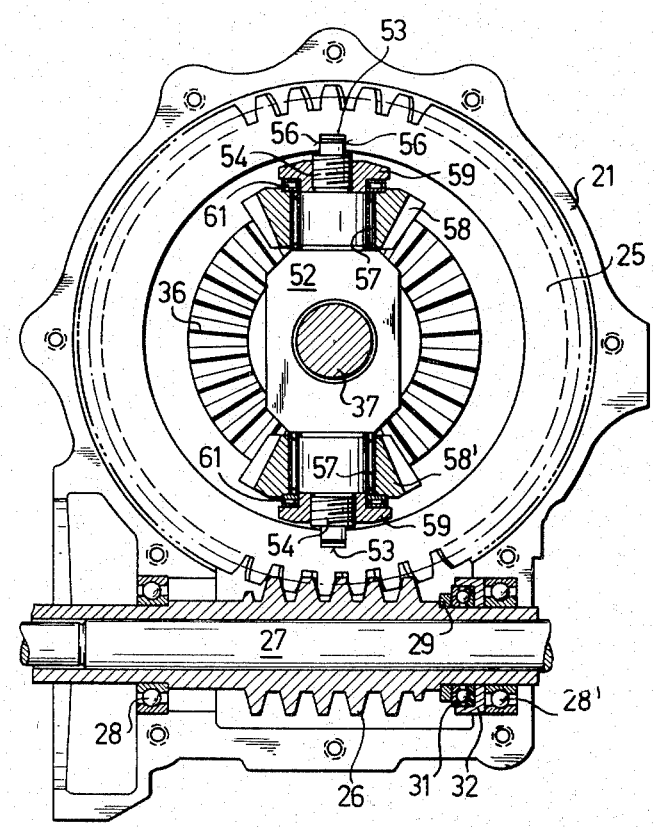
FIG. 3 illustrates a cross-sectional view taken along line III—III in FIG. 2.

Refering to FIGS. 2 and 3, an annular driving wheel 25 is journalled in the casing 21 and has wormwheel toothing and meshes with a pinion 26 in the form of a worm. The worm 26 is supported on a shaft 27 connected to the weaving machine drive by a variable speed-transmission (not shown) which is affected by the position of the tensioning beam 5. The worm 26 is journalled in two radial ball-bearings 28, 28' supported in the casing 21 and cover 22 and bears by way of a ring 29 on a ball thrust bearing 31, set in a ring 32 bearing on the stationary race of the ball-bearing 28'.

A hollow shaft 34 is mounted on two needle bearings 33, 33' in the tubular casing portion 24 in coaxial relation with the driving wheel 25. A bevel gear 36 is fixed to one end of this shaft 34 by screws 35 while the other end of the shaft 34 projects out of the needle bearing 33 and carries toothing 38. In addition, a shaft 37 is rotatably mounted in the hollow shaft 34 and a bevel gear 39 is keyed to a projecting end of the shaft 37 in opposition to the bevel gear 36 so that the sets of teeth on the bevel gears 36 and 39 face one another. In order to secure the bevel gear 39 axially, the end of the shaft 37 is reduced to form a threaded stud 43 to carry a washer 42 to bear on the hub of the gear 39 and a nut 44. A pinion 45 is shrunk onto the other end of the shaft 37 and is supported in a radial ball-bearing 46 mounted in the casing portion 24. The distance between the pinion 45 and the toothed end of the hollow shaft 34 is determined by a ball thrust bearing 47. The radial ball-bearing 46 is secured axially by means of a plate 48 which bears on the rotatable bearing race and is fixed to the pinion 45 by screws 49.

Beside the toothing 38, the casing portion 24 contains a hole 51 through which the gearwheel 12' associated with the warp beam 4 can project into the portion 24 and mesh with the toothing 38. A corresponding hole (not shown in FIG. 2) is provided in the portion 24 in the vicinity of the toothing of the pinion 45 so that the pinion 16 co-operating with the gearwheel 12 for the warp beam 3 can mesh with the pinion 45.

A carrier or yoke 52 is positioned between the bevel gears 36, 39 and surrounds the shaft 37 with a clearance while being guided at both ends in two slots (guides) 53 diametrically opposite one another in the driving wheel 25. The ends of the carrier 52 are in the form of threaded studs 54 into each of which two mutually parallel sliding surfaces 55 are milled. When the carrier 52 engages in the driving wheel 25, the sliding surfaces 55 of the studs 54 bear on the sides 56 of the slots 53.

The carrier 52 carries two mutually opposite planet bevel pinions 58, 58' which mesh with the two bevel gears 36, 39. Each planet pinion 58, 58' is supported on a needle bearing 57. Nuts 59 are provided on the studs 54 to secure the planet pinions 58, 58' and to maintain the axial distance between them. Each of the nuts 59 can be tightened on to a needle thrust bearing 61 bearing on the associated planet pinion 58 or 58'.

The slots 53 in the driving wheel 25 extend axially relative to the driving wheel 25. The depths of the slots 53 and the clearance between the carrier 52 and the shaft 37 are preferably such that the assembly comprising the carrier 52 and the planet pinions 58, 58' is axially movable as a whole both relative to its longitudinal axis and relative to the rotational axis of the driving wheel 25. This "floating" mounting enables the carrier 52 to always take up a position such that the tooth forces exerted on the planet pinions 58, 58' cancel one another out exactly. The amplitude of this compensatory movement is determined by the backlash of the differential gear, which, as is well known, may for example be approximately 0.2 millimeters (mm) per wheel.

In the weaving machine, the tensioning beam 5 produces a tension in the warp yarns 11, 11' and keeps this tension constant, so that the total take-up force for the yarns 11, 11' remains substantially constant. The tensioning beam 5 also controls, by way of operating means (not shown) for the input of the differential gear 17, the letting off of the yarns 11, 11' from the warp beams 3, 4.

The take-up torques exerted on the warp beams 3, 4 by the two groups of warp yarns 11, 11' are transmitted by one of the associated step-up or step-down transmissions (warp beam transmissions), i.e. the gearwheels 12, 13, 14, 16 and 45 or 12' and 38, to the corresponding bevel gear 39 or 36 and from this, by way of the planet pinions 58, 58', to the driving wheel 25. The worm 26 meshing with the driving wheel 25 is self-locking, so that the driving wheel 25 is held back when the warp beams 3, 4 are at a standstill. This produces, in a known manner, the opposing torque required to generate the warp tension. The take-up forces exerted on the two warp beams 3, 4 by the warp yarns 11, 11' are thus equal.

When the yarns 11, 11' are let off, the driving wheel 25 is turned by the worm 26 until the required length of warp can be taken off the beams 3, 4. During normal weaving and, if the roll diameter on the two beams 3, 4 remains the same, the driving wheel 25 and the bevel gears 36, 39 rotate at the same speed.

If the warp has been wound unevenly on to one of the beams 3, 4 and particularly if different frictional resistances occur in the warp beam bearings, the speed of one warp beam 3, 4 may change slightly. The differential gear 17 compensates for such variations in a known manner, the bevel gears 36, 39 twisting relative to one another. The planet pinions 58, 58' on the freely movable carrier 52 also turn accordingly on their axes. The planet pinions 58, 58' can take up positions over a fairly wide range, determined by the backlash between the tooth surfaces of the meshing bevel gears. By means of this "self-centering," the planet pinions 58, 58' can adapt themselves to the positions of the bevel gears 36, 39, so that both the gears in each co-operating pair of bevel gears are evenly stressed. The content ratios and the friction between the tooth surfaces are the same everywhere.

Because the differential gear is mounted in the common casing 22, the exact axial positioning of the driving wheel (wormwheel 25) can be ensured and this wheel can be a globoid wormwheel (in which case the worm and wormwheel must be exactly perpendicular to one another to give linear contact between them). The differential gear might also take various other forms. For example, the driving wheel and the meshing pinion can be spur gears. Also, there may be a plurality of planet bevel pinions, which are mounted, for example, either all on one common carrier or in pairs on carriers movable independently of one another.

In the embodiment illustrated, it is assumed that the warp let-off motion is positively driven and that the driving wheel 25 is driven from the weaving machine drive by way of the worm 26, the warp beams 3, 4 being made to yield intermittently in step with the cloth take-up. In another embodiment, the warp let-off motion may comprise a differential whose driving wheel has a brake. The brake produces a braking torque which is distributed between the two sectional warp beams and counteracts their take-up torques. The warp beams are therefore let off every time the brake is eased.

What is claimed is:

1. A differential gear comprising
   a driving wheel having a pair of diametrically opposite guides therein, each guide having guideways extending transversely of the axis of said wheel,
   a rotatable shaft mounted coaxially of said driving wheel,
   a pair of bevel gears mounted on said shaft coaxially of said axis of said driving wheel,
   means securing said bevel gears in axial relation to each other on said shaft,
   at least two planet bevel pinions in meshing engagement with and between said bevel gears,
   a common carrier mounting said pinions coaxially thereon, said carrier being displaceably mounted in a radial direction and axially in said guides of said driving wheel, and
   a thrust bearing means between each planet pinion and said carrier.

2. A differential gear as set forth in claim 1 wherein said guideways of each guide are parallel to a radial plane of said driving wheel to define a slot-like recess and said carrier has projecting studs disposed within each recess for movement of said carrier axially and radially of said driving wheel.

3. In combination with a differential gear as set forth in claim 1, a casing mounting said gear therein and a pinion journalled in said casing in meshing engagement with said driving wheel for rotating said driving wheel.

4. The combination as set forth in claim 3 further comprising a pair of pinions journalled in said casing in driving connection with a respective one of said bevel gears, a pair of transmissions, each said transmission being connected to a respective one of said pinions.

5. A differential gear as set forth in claim 1 wherein each thrust bearing means is adjustably mounted on said carrier.

* * * * *

UNITED STATES PATENT OFFICE
CERTIFICATE OF CORRECTION

Patent No. 3,779,102        Dated December 18, 1973

Inventor(s)    Erwin Pfarrwaller

It is certified that error appears in the above-identified patent and that said Letters Patent are hereby corrected as shown below:

Column 3, line 51, before "56" insert --(guideways)--.

Column 3, line 62 after "25" insert --with the guideways 56 extending transversely of the plane of rotation of the wheel 25--.

Column 5, line 14 delete "axis" and insert --plane of rotation--.

Signed and sealed this 9th day of April 1974.

(SEAL)
Attest:

EDWARD M. FLETCHER, JR.
Attesting Officer

C. MARSHALL DANN
Commissioner of Patents